United States Patent [19]
Neti

[11] Patent Number: 5,768,474
[45] Date of Patent: Jun. 16, 1998

[54] METHOD AND SYSTEM FOR NOISE-ROBUST SPEECH PROCESSING WITH COCHLEA FILTERS IN AN AUDITORY MODEL

[75] Inventor: Chalapathy V. Neti, Boca Raton, Fla.

[73] Assignee: International Business Machines Corporation, Armonk, N.Y.

[21] Appl. No.: 581,288

[22] Filed: Dec. 29, 1995

[51] Int. Cl.$^6$ .................. G01L 5/06; G01L 9/00
[52] U.S. Cl. .............. 395/2.44; 395/2.41; 395/2.42; 395/2.11; 395/2.52
[58] Field of Search .................. 395/2.41, 2.44, 395/2.11, 2.42, 2.52, 2.53, 2.54

[56] References Cited

U.S. PATENT DOCUMENTS

| | | |
|---|---|---|
| 4,400,590 | 8/1983 | Michelson . |
| 4,536,844 | 8/1985 | Lyon . |
| 5,271,397 | 12/1993 | Seligman et al. . |
| 5,331,222 | 7/1994 | Lin et al. . |
| 5,388,182 | 2/1995 | Benedetto et al. . |
| 5,402,493 | 3/1995 | Goldstein . |

OTHER PUBLICATIONS

Yang, X. et al, Auditory Repr. of Acoustic Signals, IEEE Trans Infor. Theory, v38 No.2 pp. 834–836, Mar. 1992.
Etemad, K., Phoneme recog. by multi–res. and non–causal context, Proc IEEE–SP, pp. 343–352, Sep. 1993.
Lui, W. et al, Multires. speech analys. with an analog cochlear model, Proc IEEE–SP, pp. 433–436, Oct. 1992.
Yang X, Auditory Reprsntatn of Acoustic Signals, IEEE Trans Info. Theory, v 38 No. 2 824–839, Mar. 1992.
Neti, Neuromorphic Speech Processing for Noisy Eviron., IEEE Intl Conf Neur Netw v 7 4425–30, Jul. 1994.

*Primary Examiner*—Allen R. MacDonald
*Assistant Examiner*—Robert Louis Sax
*Attorney, Agent, or Firm*—Paul T. Kashimba; Andrew J. Dillon

[57] ABSTRACT

A method for noise-robust speech processing with cochlea filters within a computer system is disclosed. This invention provides a method for producing feature vectors from a segment of speech, that is more robust to variations in the environment due to additive noise. A first output is produced by convolving a speech signal input with spatially dependent impulse responses that resemble cochlea filters. The temporal transient and the spatial transient of the first output is then enhanced by taking a time derivative and a spatial derivative, respectively, of the first output to produce a second output. Next, all the negative values of the second output are replaced with zeros. A feature vector is then obtained from each frame of the second output by a multiple resolution extraction. The parameters for the cochlea filters are finally optimized by minimizing the difference between a feature vector generated from a relatively noise-free speech signal input and a feature vector generated from a noisy speech signal input.

15 Claims, 3 Drawing Sheets

METHOD AND SYSTEM FOR NOISE-ROBUST SPEECH PROCESSING WITH COCHLEA FILTERS IN AN AUDITORY MODEL

BACKGROUND OF THE INVENTION

1. Technical Field

The present invention relates to a method and system for speech processing in general, and in particular to a method for processing speech based on a mammalian auditory model within a computer system. Still more particularly, the present invention relates to a method for noise-robust speech processing with cochlea filters in an auditory model.

2. Description of the Prior Art

The objective of speech recognition is to classify an input pattern—speech signal—as a sequence of stored patterns that have been learned previously. These stored patterns may be made up of units such as words, or shorter units such as phonemes (the smallest contrastive sounds of a language). Under the pattern-matching philosophy, speech recognition is performed by generating a feature vector of a short segment of speech, followed by a statistical pattern recognition on some finite grouping of these feature vectors which correspond to a unit or a shorter unit of speech. Hence, speech recognition may be broadly classified into three stages, namely, feature analysis, pattern classification, and language processing.

Feature analysis is intended for distilling any information that is necessary for speech recognition from raw speech signals. Also, it discards irrelevant information such as background noise, channel distortion, speaker characteristics, and manner of speaking. One method for feature analysis involves the modeling of the human auditory system. Auditory modeling usually begins with a set of overlapping bandpass filters that are more or less similar to the sensitivity of the cochlear membrane, and the nonlinear effects that occur in human auditory processing are then included.

Typically, the accuracy of a speech recognition system tends to degrade in the presence of noise, and auditory modeling has shown some promise in providing a noise-robust speech recognition system. Various approaches have also been utilized attempting to account for the variations in the feature vector caused by noise. Some of these approaches are based on the development of better distortion metrics that are more robust to any variation in the feature vectors. Other approaches concentrate on an additive compensation in the feature vector domain, or by transformations in vector quantization domain from noisy to a reference vector quantization codebook. Still others develop speech prototypes that can account for specific variations due to noise.

Because improvement in robustness of feature analysis to noise would result in a significant increase in the accuracy of a speech recognition system, it would be desirable to provide a method for producing feature vectors from a segment of speech that are more robust to variations in the environment due to additive noise.

SUMMARY OF THE INVENTION

In view of the foregoing, it is therefore an object of the present invention to provide an improved method and system for speech processing.

It is another object of the present invention to provide an improved method and system for processing speech based on a mammalian auditory model within a computer system.

It is yet another object of the present invention to provide an improved method and system for noise-robust speech processing with cochlea filters in an auditory model.

In accordance with the method and system of the present invention, a first output is produced by convolving a speech signal input with spatially (frequency) dependent impulse responses resembling cochlea filters. The temporal transient of the first output is then enhanced by taking a time derivative of the first output to produce a second output. Subsequently, the spatial transient of the second output is enhanced by taking a spatial derivative of the second output to produce a third output. Next, all the negative values of the third output are replaced with zeros. A feature vector is then obtained from each frame of the third output by a multiple resolution extraction. The parameters for the cochlea filters can finally be optimized by minimizing the difference between a feature vector generated from a relatively noise-free (clean) speech signal input and a feature vector generated from a noisy speech signal input.

All objects, features and advantages of the present invention will become apparent in the following detailed written description.

BRIEF DESCRIPTION OF THE DRAWINGS

The invention itself, as well as a preferred mode of use, further objects and advantage thereof, will best be understood by reference to the following detailed description of an illustrative embodiment when read in conjunction with the accompanying drawings, wherein.

DETAILED DESCRIPTION OF PREFERRED EMBODIMENT

The present invention may be executed in a variety of computers under a number of different operating systems. The computer may be, for example, a personal computer, a mini-computer or a mainframe computer. In addition, the computer may be a stand-alone system or part of a network such as a local-area network (LAN) or a wide-area network (WAN). For the purpose of illustration, a preferred embodiment of the present invention, as described below, is implemented on a personal computer, such as the Aptiva™ series manufactured by International Business Machines Corporation.

Figure 1A:
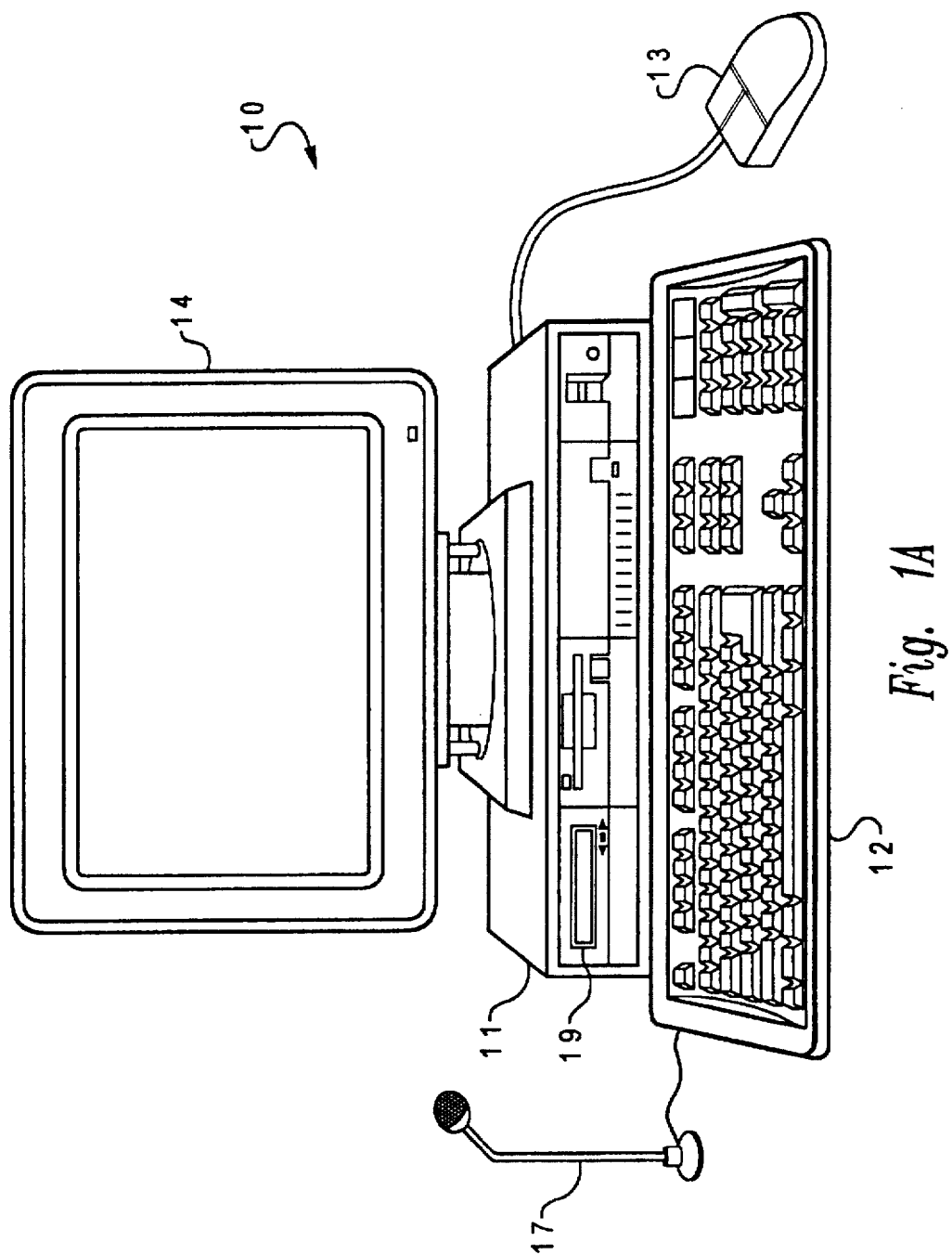
FIG. 1A is a pictorial diagram of a personal computer utilized by a preferred embodiment of the invention.

Referring now to the drawings and in particular to FIG. 1A, there is depicted a diagram of personal computer 10 which may be utilized by a preferred embodiment of the present invention. Personal computer 10 comprises processor unit 11, keyboard 12, mouse 13, microphone 17 and graphic display 14. Keyboard 12, mouse 13 and microphone 17 constitute user input devices, and graphic display 14 constitutes an output device.

Figure 1B:
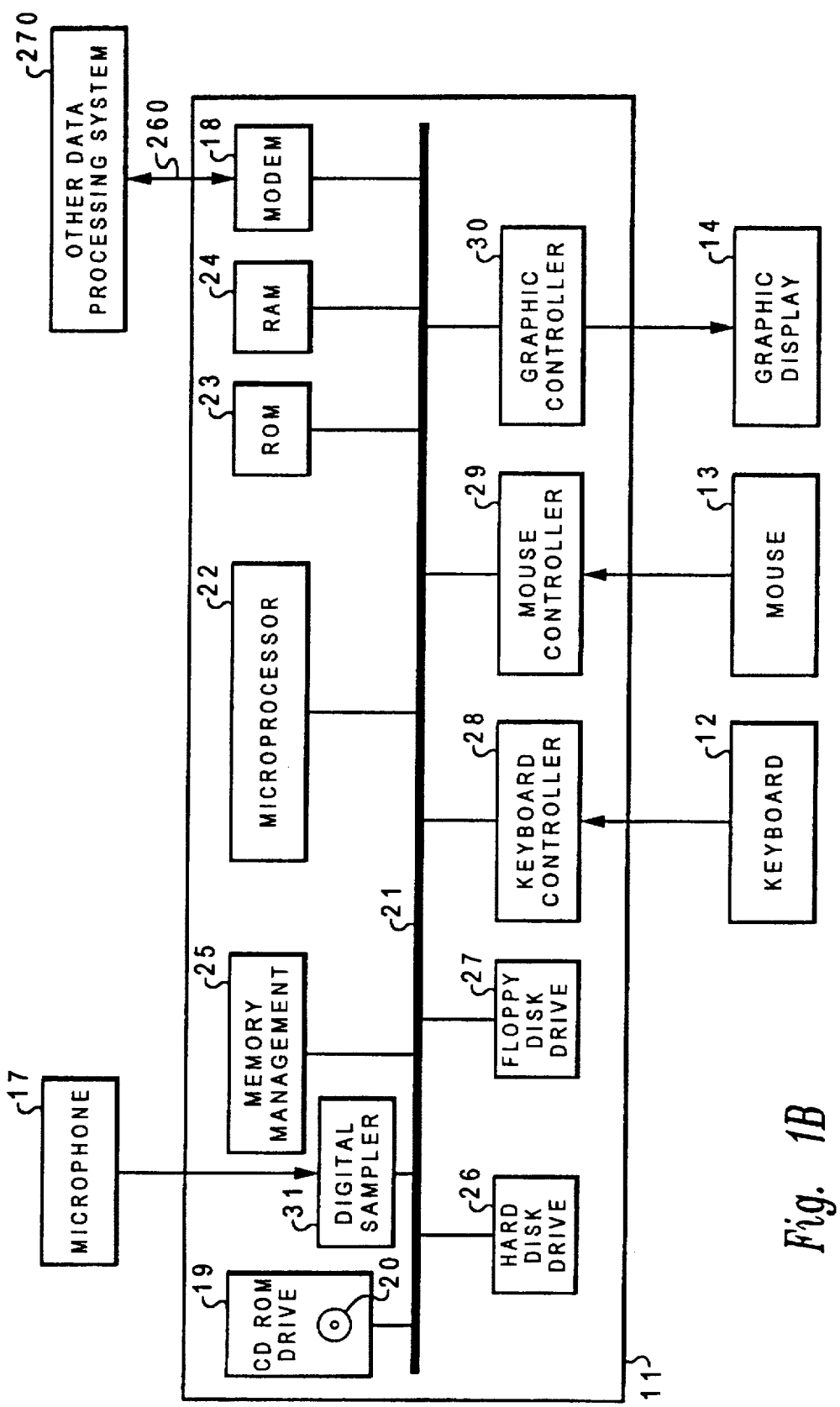
FIG. 1B is a block diagram of the components for the personal computer depicted in FIG. 1A.

Referring now to FIG. 1B, there is illustrated a block diagram of the components for personal computer 10 depicted in FIG. 1A. Processor unit 11 includes system bus 21 to which various components are attached and by which communications among various components are accomplished. Microprocessor 22, connecting to system bus 21, is supported by read only memory (ROM) 23 and random access memory (RAM) 24, both of which are also connected to system bus 21. ROM 23 contains, among other codes, the Basic Input/Output System (BIOS) which controls certain basic hardware operations, such as interactions of hard disk drive 26 and floppy disk drive 27. RAM 24 is the main memory within which the operating system and application programs having the present invention incorporated are loaded. A memory management device 25 is connected to system bus 21 for controlling all Direct Memory Access (DMA) operations between RAM 24 and hard disk drive 26 or floppy disk drive 27.

As shown in FIG. 1B, a CD ROM drive 19 having a compact disk 20 inserted inside is installed within processor unit 11. Further, a modem 17 may be utilized to communicate with other data processing systems 270 across communications line 260.

Processor unit 11 further comprises one digital sampler 31 and three input/output (I/O) controllers, namely, keyboard controller 28, mouse controller 29 and graphic controller 30, all of which are connected to system bus 21. As its name implies, digital sampler 31 is for sampling and digitizing audio inputs received directly from microphone 17. As for the I/O controllers, keyboard controller 28 provides the hardware interface for keyboard 12, mouse controller 29 provides the hardware interface for mouse 13, and graphic controller 30 provides the hardware interface for graphic display 14. The hardware setup illustrated in FIGS. 1A and 1B is typical but may vary for a specific application.

Figure 2:
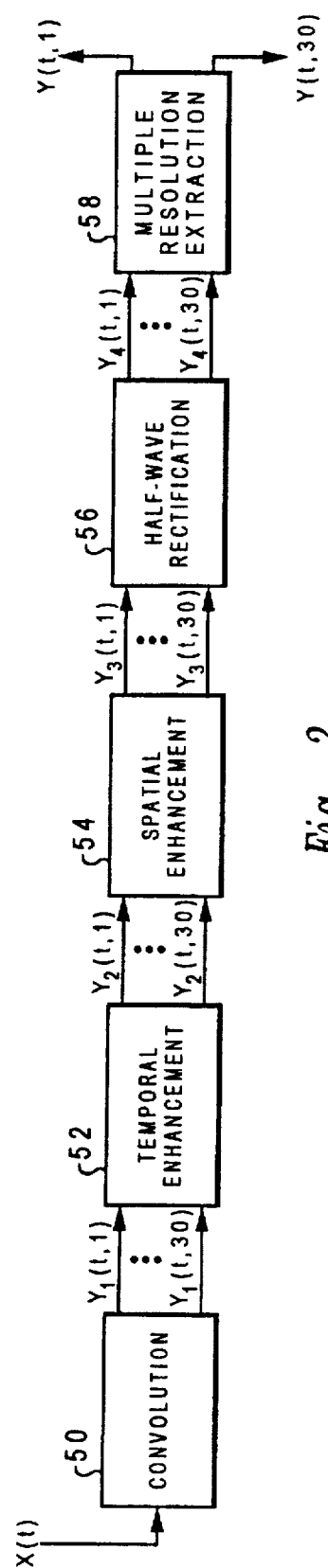
FIG. 2 is a block diagram of a method for noise-robust speech processing with cochlea filters within a computer system according to a preferred embodiment of the invention.

With reference now to FIG. 2, there is illustrated a block diagram for noise-robust speech processing with cochlea filters within a computer system, according to a preferred embodiment of the invention. First, an analog speech signal may be obtained from microphone 17, which is then converted to a digital form as speech input, x(t), for input to block 50. Speech input, x(t), may also come from a computer usable medium such as hard disk drive 26 or compact disk 20.

Convolution

At block 50, a linear convolution is performed between the speech input, x(t), and impulse responses, h(t,s), of cochlear filters having s as the spatial locations of the filters on the cochlea, as follows:

$$y_1(t,s) = h(t,s) *_t x(t)$$

where $*_t$ denotes convolution in time. As a preferred embodiment of the present invention, impulse responses h(t,s) is modeled as a lowpass filter followed by a bandpass filter, and the filtering is carried out in the time domain by utilizing a bi-linear transform on the continuous time filter transformations. In addition, thirty spatial positions along the s dimension (on a logarithmic scale) are preferably chosen to represent the thirty cochlear filters.

Temporal Enhancement

The next step is the modeling of the hair cells in the cochlea. At block 52, the modeling of the cochlea hair cells are represented by a time derivation of $y_1(t,s)$, a compressive non-linearity operation g(), and a lowpass filter w(t) as:

$$y_2(t,s) = g(\partial_t y_1(t,s)) *_t w(t)$$

The operation g() can be performed with a function having a compressive non-linearity characteristic, e.g., $(1+e^{-x})^{-1}$. The lowpass filter w(t) may be any lowpass filter that is capable of smoothing the $y_1(t,s)$ signals after the compressive non-linearity operation is completed.

Spatial Enhancement

At block 54, a spatial derivative operation is performed on the $y_2(t,s)$ signals across the s axis as:

$$y_3(t,s) = \partial_s y_2(t,s) *_s v(s)$$

The spatial derivative operation models the lateral inhibitory neural processing and is an important step for noise reduction in the final representation. Again, a lowpass filter, v(s), is utilized to smooth the $y_2(t,s)$ signals after the spatial derivative operation is completed. The spatial derivative operation is described in detail in Wang et al., "Noise robustness in the auditory representations of the speech signal," *Proc. IEEE Intl. Conf. on Acoustics Speech and Signal Processing*, 1993, and is incorporated herein by reference. In addition, according to Yang et al. in "Auditory Representations of Acoustic Signals," *IEEE transactions of Information Theory, Special Issue on Wavelet Transforms and Multiresolution Analysis*, 38(2), 1992, the $y_3(t,s)$ signals can be approximated by taking the partial derivative of the $y_2(t,s)$ signals with respect to s at the peaks of the $y_1(t,s)$ signals.

Half-Wave Rectification

Following the spatial derivative operation, half-wave rectified signals, $y_4(t,s)$, is generated at block 56 as:

$$y_4(t,s) = \max(y_3(t,s), 0)$$

The half-wave rectification may simply be performed by replacing all the negative values in $y_3(t,s)$ with zeros.

Multiple Resolution Extraction

At this point, instead of summing the signals $y_4(t,s)$ over a constant interval of 10–20 ms across all channels s as suggested by Yang et al., the signals $y_4(t,s)$ are summed over a time interval that is proportional to the center frequency of the bandpass channel s, $cf_s$, at block 58. Because a speech recognizer typically expects a feature vector at the end of every frame, typically 10 or 20 ms in length, rather than taking the average over each frame (6 times the time period of the channel) for high-frequency channels, the maximum of the spatial derivative for each frame is preferably chosen, as follows:

$$y_5(t_i, s) = \frac{1}{T_s} \int_{t_i}^{t_i + T_s} y_4(t, s) dt \text{ where } i = 1 \ldots n$$

$$T_s = 6 * \frac{1}{cf_s}$$

$$t_i = t + i * T_s, \text{ where } n = \frac{T}{T_s}$$

$$y(t, s) = \max_i y_5(t_i, s) - \theta(s)$$

where θ(s) is a channel-specific threshold, and y(t,s) is the neuromorphic representation of the output signal. T depends on the length of each frame as expected by the speech recognizer. As a preferred embodiment of the invention, each frame of the speech input is expected to be 10 ms, which yields a T of 0.01.

As a preferred embodiment of the invention, thirty channels is first extracted from each frame. Then, a number of time intervals is selected according to the center frequency, $cf_s$, of each of the thirty channels. Next, the $y_4(t,s)$ signal values within each of these time intervals are summed to obtain $y_5(t_i,s)$. Finally, the maximum value of the summed values, relative to a channel-specific threshold, is selected for that particular channel as $y(t,s)$.

Optimization

To further continue with the noise-robust speech processing algorithm after the feature vector extraction, the noise in the acoustic representation can be reduced by optimizing the parameters within the impulse responses, $h(t,s)$. As a preferred embodiment of the invention, the optimization of the parameters can be performed as follows:

The bandpass filters for describing the cochlear filters have a continuous time transfer function $$H(j\omega, s) = \frac{\frac{\omega_0(s)}{Q(s)} * j\omega}{-\omega^2 + \frac{\omega_0(s)}{Q(s)} * j\omega + \omega_0^2(s)}$$

Instead of parameterizing each individual $Q(s)$ and $\omega_0(s)$, the thirty $Q(s)$ and $\omega_0(s)$ can be generated by choosing the first $Q(s)$ (denoted as $Q_{base}$) and the last $Q(s)$ (denoted as $Q_{apex}$), the first $\omega_0(s)$ (denoted as $\omega_{base}$) and the last $\omega_0(s)$ (denoted as $\omega_{apex}$), and the individual $Q(s)$ and $\omega_0(s)$ are calculated by $$Q(s_i) = Q(s_{i-1}) * \left(\frac{Q_{apex}}{Q_{base}}\right)^{\frac{1}{29}} \text{ where } i = 2 \ldots 29$$

$$Q(s_1) = Q_{base}; \quad Q(s_{30}) = Q_{apex}$$

$$\omega_0(s_i) = \omega_0(s_{i-1}) * \left(\frac{\omega_{apex}}{\omega_{base}}\right)^{\frac{1}{29}} \text{ where } i = 2 \ldots 29$$

$$\omega_0(s_1) = \omega_{base}; \quad \omega_0(s_{30}) = \omega_{apex}$$

Let $\rho$ be the set of parameters of $H(j\omega,s)$ including s. Let $y_n(t,s)$ be the noisy output of the acoustic processing corresponding to the noise corrupted signal $x(t)$, and let $y(t,s)$ be the clean output. By defining $$R_t(\rho) = \frac{1}{S} \sum_{s=1}^{S} [y_n(t, \rho(s)) - y(t, \rho(s))]^2$$

and $$E(\rho) = \frac{1}{T} \sum_{t=1}^{T} R_t(\rho)$$

where S denotes the number of spatial locations, and T denotes the number of time frames. Then the optimization problem solved to estimate optimal parameters $\rho$ is defined as:

$$\min_{E(\rho)_{\rho}}$$

and this equation can be solved by utilizing any standard method for unconstrained optimization which is well known to a person who is skilled in the art of optimization.

Results

A useful, though coarse, method for measuring the quality of a noise reduction system is by its signal-to-noise ratio (SNR); while the best method for measuring the noise reduction capability of a speech recognition system is by its improvement in speech recognition performance. Hence, to test the neuromorphic representation, $y(t,s)$, as a means to improve the performance of any speech recognition system trained on nominally quiet data, the SNR improvement may be utilized as a measure of noise reduction.

For the purpose of illustrating the results of the present invention, SNR may be computed by estimating both the mean power of a clean signal and the mean power of noise, averaging over the entire analysis period (and averaging across frequency for the time-frequency representations). Thus, SNR in dB can be expressed as:

$$SNR = 10 * \log \frac{\text{<average signal power>}}{\text{<average noise power>}}$$

Because this method of illustration involves adding noise to clean speech signals, the noise component of the representation is estimated by subtracting the clean representation from the noisy representation and computing the resulting average power. From a speech recognition standpoint this measure provides an estimate of the amount of distortion from the clean representation.

Several sets of speech signals were utilized for illustrating the results. The first data set consisted of an 80 ms synthetic chirp signal with frequency varying from 300 Hz to 3100 Hz. White noise was then added to produce a noisy chirp signal over the same 80 ms interval at an SNR of −5.574 dB. Data set Speech1 consisted of 100 ms of speech signal, sampled at 20 KHz, having a combination of silence and the beginning of the word "imagine." A more realistic noise, such as cafeteria noise, collected in a cafeteria during lunch hours, was added to generate noisy speech signals at SNRs of 0.91 dB and −2.45 dB, respectively. Data set Speech2, having the word "imagine," is generated by contaminating 500 ms of speech with cafeteria noise at SNRs of 3.14 and 6.37 dB, respectively. Data set Speech3, having the word "a" with some silence, is generated by contaminating 500 ms of speech with cafeteria noise at SNRs of 3.46 and 6.82 dB, respectively.

TABLE 1

| Data set | SNR (STFT) | SNR (initial) | SNR (optimal) |
| --- | --- | --- | --- |
| Chirp | −5.57 | 2.80 | 5.48 |
| Speech1 | 0.91 | 3.93 | 5.90 |
| Speech1 | −2.45 | −2.83 | 3.21 |
| Speech2 | 3.14 | 5.98 | 7.50 |
| Speech2 | 6.37 | 9.29 | 13.85 |
| Speech3 | 3.46 | 5.17 | 7.85 |
| Speech3 | 6.82 | 8.00 | 14.38 |

The results of these data sets are shown in Table 1. In Table 1, column 2 shows the SNRs based on a short-time Fourier transform (STFT) analysis, column 3 shows the SNRs for the initial values of the cochlear filter parameters based on some neurophysiological data, and column 4 shows the SNRs based on optimal filter parameters found by solving the optimization problem. Note that with the optimizing procedure according to a preferred embodiment of the invention, an improvement of about 10 dB is obtained for the chirp signal when compared to the STFT representation. Further, there is about 5 dB improvement for noisy speech signal Speech1 at both 0.91 dB and −2.45 dB, about 4.4 dB improvement for noisy speech signal Speech2 at 3.14 dB and noisy speech signal Speech3 at 3.46 dB, and about 7.5 dB improvement for noisy speech signal Speech2 at 6.37 dB and noisy speech signal Speech3 at 6.82 dB. Also, the representations using the initial parameters based on neurophysiology have better SNRs when compared to each respective STFT representation, with the exception of the noisy speech signal Speech1 at −2.45 dB.

As has been described, the present invention provides an improved method for optimizing cochlear filters and filter-specific thresholds for an acoustic-processing algorithm based on mammalian auditory processing. The processing method under the present invention exhibits a very graceful degradation in the presence of speech-like noise as compared to any Fourier-spectrum based techniques.

While the invention has been particularly shown and described with reference to a preferred embodiment, it will be understood by those skilled in the art that various changes in form and detail may be made therein without departing from the spirit and scope of the invention.

What is claimed is:

1. A method for noise-robust speech processing with cochlea filters within a computer system, said method comprising the steps of:

convolving a speech signal input with impulse responses resembling said cochlea filters to produce a first output;

enhancing a temporal transient of said first output to produce a second output;

enhancing a spatial transient of said second output to produce a third output;

replacing all negative values of said third output with zeros to produce a fourth output;

extracting a feature vector from each frame of said fourth output by multiple resolution, wherein said each frame has a specified length, wherein said extracting step further comprises defining a plurality of channels for said each frame;

for each of said plurality of channels, selecting a plurality of time intervals according to a center frequency of that particular channel; and optimizing a plurality of cochlea filter parameters by utilizing said feature vector from said each frame to determine said cochlea filters.

2. The method for noise-robust speech processing with cochlea filters within a computer system in claim 1, said enhancing a temporal transient step further comprises the steps of taking a time derivative and performing a compressive non-linearity operation on said first output.

3. The method for noise-robust speech processing with cochlea filters within a computer system in claim 1, said enhancing a spatial transient step further comprises the step of taking a smoothed spatial derivative on said second output.

4. The method for noise-robust speech processing with cochlea filters within a computer system in claim 1, said extracting a feature vector step further comprises the steps of:

for each of said plurality of channels, summing the values of said fourth output within each of said plurality of time intervals, and for each of said plurality of channels, selecting a maximum value of said summed values.

5. The method for noise-robust speech processing with cochlea filters within a computer system in claim 1, said optimizing step further comprises the step of determining said cochlea filters by minimizing the difference between a feature vector generated from a relatively noise-free speech signal and a feature vector generated from a noisy speech signal.

6. A computer system for noise-robust speech processing with cochlea filters, said computer system comprising:

means for convolving a speech signal input with impulse responses resembling said cochlea filters to produce a first output;

means for enhancing a temporal transient of said first output to produce a second output;

means for enhancing a spatial transient of said second output to produce a third output;

means for replacing all negative values of said third output with zeros;

means for extracting a feature vector from each frame of said third output by multiple resolution, wherein said each frame has a specified length, wherein said means for extracting further comprises means for defining a plurality of channels for said each frame, means for selecting a Plurality of time intervals according to a center frequency of that particular channel for each of said plurality of channels; and means for optimizing a plurality of cochlea filter parameters by utilizing said feature vector from said each frame to determine said cochlea filters.

7. The computer system for noise-robust speech processing with cochlea filters in claim 6, said means for enhancing a temporal transient further comprises means for taking a time derivative and performing a compressive non-linearity operation on said first output.

8. The computer system for noise-robust speech processing with cochlea filters in claim 6, said means for enhancing a spatial transient further comprises means for taking a smoothed spatial derivative on said second output.

9. The computer system for noise-robust speech processing with cochlea filters in claim 6, said means for extracting a feature vector further comprises:

means for summing the values of said fourth output within each of said plurality of time intervals, for each of said plurality of channels, and means for selecting a maximum value of said summed values, for each of said plurality of channels.

10. The computer system for noise-robust speech processing with cochlea filters in claim 6, said means for optimizing further comprises means for determining said cochlea filters by minimizing the difference between a feature vector generated from a relatively noise-free speech signal and a feature vector generated from a noisy speech signal.

11. A computer program product residing on a computer usable medium for noise-robust speech processing with cochlea filters, said computer product comprising:

program code means for convolving a speech signal input with impulse responses resembling said cochlea filters to produce a first output;

program code means for enhancing a temporal transient of said first output to produce a second output;

program code means for enhancing a spatial transient of said second output to produce a third output;

program code means for replacing all negative values of said third output with zeros;

program code means for extracting a feature vector from each frame of said third output by multiple resolution, wherein said each frame has a specified length, wherein said program code means for extracting further comprises program code means defining a plurality of channels for said each frame, program code means for selecting a Plurality of time intervals according to a center frequency of that particular channel, for each of said plurality of channels; and program code means for optimizing a plurality of cochlea filter parameters by utilizing said feature vector from said each frame to determine said cochlea filters.

12. The computer program product residing on a computer usable medium for noise-robust speech processing with cochlea filters in claim 11, said computer product further comprises program code means for taking a time derivative and performing a compressive non-linearity operation on said first output.

13. The computer program product residing on a computer usable medium for noise-robust speech processing with cochlea filters in claim 11, said computer product further comprises program code means for taking a smoothed spatial derivative on said second output.

14. The computer program product residing on a computer usable medium for noise-robust speech processing with cochlea filters in claim 11, said computer product further comprises:

program code means for summing the values of said fourth output within each of said plurality of time intervals, for each of said plurality of channels, and program code means for selecting a maximum value of said summed values, for each of said plurality of channels.

15. The computer program product residing on a computer usable medium for noise-robust speech processing with cochlea filters in claim 11, said computer product further comprises program code means for determining said cochlea filters by minimizing the difference between a feature vector generated from a relatively noise-free speech signal and a feature vector generated from a noisy speech signal.

* * * * *

UNITED STATES PATENT AND TRADEMARK OFFICE
CERTIFICATE OF CORRECTION

PATENT NO. : 5,768,474
DATED : June 16, 1998
INVENTOR(S) : Neti

It is certified that error appears in the above-identified patent and that said Letters Patent is hereby corrected as shown below:

At column 5, line 56, please change the equation $$\min E(p)p$$

to $$\min_p E(p)$$

Signed and Sealed this

Twenty-fourth Day of November, 1998

Attest:

BRUCE LEHMAN

Attesting Officer   Commissioner of Patents and Trademarks